United States Patent
Flehmig (10) Patent No.: US 9,908,187 B2
(45) Date of Patent: Mar. 6, 2018

(54) TOOL AND METHOD FOR SHEAR CUTTING A WORKPIECE

(71) Applicant: Thomas Flehmig, Ratingen (DE)

(72) Inventor: Thomas Flehmig, Ratingen (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 183 days.

(21) Appl. No.: 14/602,047

(22) Filed: Jan. 21, 2015

(65) Prior Publication Data
US 2016/0207125 A1   Jul. 21, 2016

(30) Foreign Application Priority Data
Jan. 21, 2014   (DE) .................. 10 2014 100 645

(51) Int. Cl.
| | | |
|---|---|---|
| B23D 15/08 | (2006.01) | |
| B26D 1/04 | (2006.01) | |
| B23D 33/08 | (2006.01) | |
| B23D 15/04 | (2006.01) | |
| B23D 35/00 | (2006.01) | |

(52) U.S. Cl.
CPC ............ *B23D 33/08* (2013.01); *B23D 15/04* (2013.01); *B23D 15/08* (2013.01); *B23D 35/001* (2013.01); *B26D 1/045* (2013.01)

(58) Field of Classification Search
CPC ................................ B23D 33/08; B23D 1/045
USPC ............................................. 83/694, 916, 13
See application file for complete search history.

(56) References Cited

U.S. PATENT DOCUMENTS

| | | | | |
|---|---|---|---|---|
| 3,656,379 A | * | 4/1972 | Clark | B21D 28/00 409/304 |
| 3,739,669 A | * | 6/1973 | Seki | B21D 28/16 83/123 |
| 4,942,798 A | | 7/1990 | Taub et al. | |
| 5,458,158 A | * | 10/1995 | Kawanabe | B21F 11/00 140/105 |
| 6,041,639 A | * | 3/2000 | Pacher | B21D 25/02 72/294 |

(Continued)

FOREIGN PATENT DOCUMENTS

| | | |
|---|---|---|
| CN | 1046109 A | 10/1990 |
| DE | 7973 C | 12/1954 |

(Continued)

OTHER PUBLICATIONS

English language Abstract for JP S62255009 A listed above.

(Continued)

*Primary Examiner* — Omar Flores Sanchez
(74) *Attorney, Agent, or Firm* — thyssenkrupp North America, Inc.

(57) ABSTRACT

The present disclosure proposes a tool for shear cutting, wherein the tool has a lower blade, a hold-down device and an upper blade, wherein the lower blade has a pressure-loaded surface and a cutting surface, wherein it is possible for a workpiece to be arranged between the hold-down device and the contact surface, wherein the upper blade is movable in relation to the lower blade along a cutting direction predetermined by the cutting surface, wherein a contour profile of the lower blade has a jagged elevation at the transition from the cutting surface to the pressure-loaded surface.

14 Claims, 4 Drawing Sheets

(56) References Cited

U.S. PATENT DOCUMENTS 8,156,780 B2 *  4/2012  Fellenberg ............. B21D 28/02
                                                    72/324
2003/0029288 A1  2/2003  Golovashchenko et al.

FOREIGN PATENT DOCUMENTS

| JP | S55131421 A | 10/1980 |
| JP | S62255009 A | 11/1987 |
| JP | H08-332529 A | 12/1996 |
| JP | H091419 A | 1/1997 |
| JP | H09150309 A | 6/1997 |
| JP | 2011200936 A | 10/2011 |
| KR | 10-0562016 B1 | 3/2006 |
| WO | 2010142775 A | 6/2010 |

OTHER PUBLICATIONS

English language Abstract for JP 2011-200936 A listed above.
English language Abstract for JP H09150309 A listed above.
English language Abstract for JP S55131421 A listed above.
English language Machine translation for KR 10-0562016 B1 listed above.
English language Abstract for JP H08-332529 A listed above.
English language Abstract for JP H091419 A listed above.
German Office Action dated Nov. 19, 2014 for priority application DE 10 2014 100 645.3 listed for reference DD7939; In the Office Action, reference DD7939 [drawings 1 and 2] was cited against the German '645 application.
German Office Action for Application No. DE2014100645.3 dated Oct. 26, 2017.

\* cited by examiner

TOOL AND METHOD FOR SHEAR CUTTING A WORKPIECE

FIELD

The present disclosure relates to a tool and method for the shear cutting of a workpiece.

BACKGROUND

Shear cutting is a DIN-standardized severing operation. On metal sheets, such a severing or cutting operation generally results in a cutting burr. Particularly on soft materials, such as steel for example, cutting burrs typically occur at the lower cutting blade or at a cutting bush. The cut sheets then have sharp edges, which pose a considerable risk of causing an accident. As a consequence, protective devices, such as protective gloves or sleeves for example, are required for handling the cut sheets. Known causes of said cutting burrs are, for example, a cutting gap chosen to be too large or the wearing down of a tool used for the cutting.

Known methods for reducing cutting burrs exist, such as precision cutting, two-stage or three-stage counter cutting, pre-cutting and after-cutting, over milling, countersinking, crimping or blending. However, in the case of precision cutting for example, increased expenditure on tooling and guiding is required to maintain the required narrow cutting gaps. Other known methods also sometimes require complex additional working steps, which correspondingly involve extra costs.

SUMMARY

An object of the present disclosure is to provide a device with which metal sheets can be cut cost-efficiently, without troublesome cutting burrs being formed on the cut sheet and in such a way as to produce rounded cutting edges.

In one embodiment of the present disclosure, a tool for shear cutting a workpiece comprises a lower blade having a first pressure-loaded surface, a first cutting surface, and a first contour profile with a first jagged elevation defined at a transition between the first cutting surface and the first pressure loaded surface. The tool further comprises a first hold-down device disposed above and opposing the lower blade and configured to permit the workpiece to be disposed between the hold-down device and the first pressure-loaded surface of the lower blade. In addition the tool further includes an upper blade that is moveable in relation to the lower blade along a cutting direction.

Other embodiments, objects, features and advantages of the present disclosure will be set forth in the detailed description of the embodiments that follows, and in part will be apparent from the description, or may be learned by practice, of the concepts disclosed herein. These objects and advantages will be realized and attained by the processes and compositions particularly pointed out in the written description and claims hereof. The foregoing Summary has been made with the understanding that it is to be considered as a brief and general synopsis of some of the embodiments disclosed herein, is provided solely for the benefit and convenience of the reader, and is not intended to limit in any manner the scope, or range of equivalents, to which the appended claims are lawfully entitled.

BRIEF DESCRIPTION OF THE DRAWINGS

The present disclosure is described in detail below with reference to the attached drawing figures, wherein.

DETAILED DESCRIPTION

While the present disclosure is capable of being embodied in various forms, the description below of several embodiments is made with the understanding that the present disclosure is to be considered as an exemplification of the claimed subject matter, and is not intended to limit the appended claims to the specific embodiments described herein. The headings used throughout this disclosure are provided for convenience only and are not to be construed to limit the claims in any way. The various embodiments disclosed herein may be combined with other embodiments for the creation and description of yet additional embodiments.

Disclosed herein is a tool for shear cutting a workpiece, particularly a sheet metal workpiece. The shear cutting tool has a lower blade, a hold-down device and an upper blade, wherein the lower blade has a pressure-loaded surface and a cutting surface, wherein it is possible for a workpiece to be arranged between the hold-down device and the pressure-loaded surface, wherein the upper blade is movable in relation to the lower blade along a cutting direction, wherein a contour profile of the lower blade has a jagged elevation, or one or more tooth-shaped projections, disposed at the transition from the cutting surface to the pressure-loaded surface.

The present disclosure has the advantage over the prior art that the formation of cutting burrs or sharp edges on the cut workpiece when sheet cutting can be avoided as a result of the jagged elevation. In this respect, the contour profile is preferably to be understood as meaning the profile along the circumference of a cross section through the lower blade. In particular, the cross section is a cross section that extends substantially perpendicularly to the pressure-loaded surface and the cutting surface. For this purpose, it is provided that the jagged elevation is oriented in relation to the hold-down device, i.e. the jagged elevation converges in such a way that a tip of the jagged elevation is directed towards the hold-down device. The cutting direction is preferably predetermined by the cutting surface. In this case, the jagged elevation comprises a cutting edge, along which the workpiece is severed.

For the severing, the workpiece is placed on the lower blade and preferably fixed with the hold-down device, a part of the workpiece to be cut protrudes beyond the cutting edge. When there is a relative movement of the upper blade along the cutting direction, the part of the workpiece that protrudes beyond the cutting edge is entrained. At the same time, the lower blade interacts with the workpiece in an interlocking manner along a direction that runs parallel to the cutting direction and thereby acts on another part of the workpiece in such a way that this other part is not entrained. As a consequence of the relative movement of the upper blade in relation to the lower blade, the part of the workpiece that is entrained is therefore separated, in particular slightly torn apart, from the part of the workpiece that is not entrained. The separation takes place in this case along a separating direction, which preferably runs at an angle to the cutting direction. It is provided in particular, that the jagged elevation is designed in such a way that, along the separating direction, the jagged elevation interacts in an interlocking manner with the part of the workpiece that is not entrained. As a result, the formation of cutting burrs is advantageously suppressed. In particular, the pressure of the hold-down device and the relative movement of the upper blade have the effect that at least a part of the part of the workpiece that is not entrained is pressed onto the jagged elevation such that an edge of the part of the workpiece that is not entrained is thereby shaped in a positive way, in particular rounded, by the jagged elevation. Furthermore, the jagged elevation can be used for fixing the workpiece to be cut. For this purpose, the workpiece is pressed onto the lower blade in such a way that the jagged elevation at least partially penetrates or enters the workpiece. Furthermore, the cutting surface preferably runs substantially perpendicularly to the pressure-loaded surface. In this case, the rounding of the edges advantageously takes place in the course of the pressing of the hold-down device and the severing of the workpiece. Furthermore, the width and the height of the jagged elevation are adapted to an extent of the workpiece that runs parallel to the cutting direction, i.e. to a thickness of the workpiece, and to a desired rounding value.

The workpiece is preferably a metal, in particular a metal sheet, preferably of a soft material with a high strain rate. Apart from monolithic workpieces, however, composite materials, in particular sandwich materials, which preferably have a core layer that is softer than the cover layers, may also be used. It is also intended that the tool is used for open and closed cuts.

Advantageous embodiments and developments of the present disclosure will be described in further detail below with reference to the attached drawings.

In a further embodiment of the present disclosure it is provided that the upper blade has a cutting surface and a pressure-loaded surface. A contour profile of the upper blade has a jagged elevation at the transition from the cutting surface to the pressure-loaded surface. Furthermore, the pressure-loaded surface and the cutting surface are arranged in such a way that an angle between the pressure-loaded surface and the cutting surface has a value of between 60° and 90°, and/or the pressure-loaded surface is curved. It is conceivable in this respect that the pressure-loaded surface is of a concave or convex design. By analogy with the lower blade, the contour profile is preferably to be understood here as meaning the profile along the circumference of a cross section through the upper blade. The cross section is in particular a cross section that extends substantially perpendicularly to the pressure-loaded surface and the cutting surface. In particular, the jagged elevation has a cutting edge. The jagged elevation can advantageously ensure that, even on the cut-off part of the workpiece, cutting burrs are avoided and rounded edges are formed on the workpiece.

In a further embodiment it is provided that the jagged elevation of the upper blade is directed substantially counter to the jagged elevation of the lower blade. In particular, the jagged elevations and their further profile are designed in such a way that, as a result of the relative movement of the upper blade, the workpiece is entrained and the jagged elevations at least partially penetrate the workpiece in the course of the relative movement. As a result, during the severing, the deforming component is increased in comparison with the tearing-apart component in a positive way. As a consequence of this, the formation of cutting burrs is reduced further and the edges of the workpiece are rounded.

In a further embodiment of the present disclosure it is provided that a cutting gap is defined by the cutting surface of the lower blade and the cutting surface of the upper blade, the cutting gap is approximately as wide as 5-20% of an extent (thickness) of the workpiece that runs parallel to the cutting direction. This comparatively large cutting gap is made possible by the jagged elevation ensuring a workpiece that is as free from burr as possible and, as a consequence of this, it is not necessary to make the effort to provide a cutting gap that is as small as possible. However, it is also conceivable that the cutting gap is approximately as wide as 4% of the extent (thickness) of the workpiece that runs parallel to the cutting direction, whereby the quality of the cutting edge can be improved further.

In a further embodiment of the present disclosure it is provided that the jagged elevation of the lower blade and/or of the upper blade has a first side surface and a second side surface. The first side surface runs along the cutting surface, while the second side surface is curved and/or goes over continuously into a pressure-loaded surface that runs perpendicularly to the cutting surface. It is also conceivable that the first side surface runs with a slight undercut with respect to the general profile of the cutting surface. Furthermore, it is provided that the edge profile on the cut workpiece is defined by the curvature of the second side surface. In particular, a second side surface going over continuously into the pressure-loaded surface causes an edge profile of the cut workpiece that is as smooth as possible.

In a further embodiment of the present disclosure it is provided that the second side surface of the lower blade and/or upper blade runs at least partially along a first circle with a first radius and/or the further second side surface runs at least partially along a second circle with a second radius. In particular, the first radius or the second radius makes it possible in a positive way to define the degree to which the edges on the cut or cut-off workpiece are rounded.

In a further embodiment of the present disclosure it is provided that the hold-down device is arranged flush with the profile of the cutting surface or protrudes into the cutting gap. In particular, the perpendicular surface of the hold-down device is aligned with the cutting surface of the lower blade.

In a further embodiment of the present disclosure it is provided that the lower blade has an indentation, or undercut, defined in a portion of the cutting surface. A slightly set-back profile, or undercut, of the cutting surface advantageously allows pushing out the cut-off workpiece, i.e. a chad, to take place already in the course of the cutting up.

In a further embodiment of the present disclosure it is provided that the upper blade and/or lower blade has an indentation and/or a recess at the cutting surface, the indentation and/or the recess is at least partially formed with an acute angle. In particular, the cutting surface of the upper blade and/or lower blade has a z-shaped offset profile, which has a positive or negative direction of the Z tip. In other words: the profile of the cutting surface is designed in such a way that the cutting gap varies along the cutting direction. As a result, the upper blade and/or lower blade can be advantageously configured in such a way that it is suitable for an after-cut on the workpiece. Such an after-cut can be realized by a forward and/or return stroke. As a result, a tool with which the cutting result can be improved further in an uncomplicated way can be advantageously provided.

In a further embodiment of the present disclosure it is provided that the tool has a counterholder, it is possible for the workpiece to be arranged between the upper blade and the counterholder. The counterholder advantageously makes it possible to assist, or if appropriate end, the movement of the entrained workpiece. If the upper blade comprises a jagged elevation, the cut-off workpiece can be pushed or pressed against the counterholder by the pressure of the counterholder and/or by a continuation of the relative movement of the upper blade and the edge of the cut-off workpiece can be shaped, in particular rounded, by means of the jagged elevation.

In a further embodiment of the present disclosure it is provided that the cutting surface of the lower blade is inclined with respect to the cutting surface of the upper blade: in the case of an open cut by between 1° and 5°; or in the case of a closed cut by between 10° and 20°. As a result, continuous trimming cuts can be advantageously realized.

In a further embodiment it is provided that the upper blade is part of a punch and the lower blade is part of a cutting die. In particular, it is provided that the tool is intended for punching, cutting out, stamping or cutting up. The punch preferably additionally has a guiding means, the guiding means controlling the positioning of the punch on the workpiece or the relative movement of the punch in relation to the cutting die. As a result, the workpiece can be severed, punched and/or stamped in a particularly precise way.

In a further embodiment of the present disclosure it is provided that a shearing angle is formed between the pressure-loaded surfaces of the upper blade and of the lower blade by an inclination of the same in relation to one another. The shearing angle is preferably 1° to 5° and can lead to the shearing force being reduced.

In addition, further disclosed herein is a method for cutting up a workpiece, in particular with the aid of a tool such as that described above, the workpiece first is arranged between the hold-down device and the lower blade, and by continuing the jagged elevation is made to enter at least partially into the workpiece and the upper blade subsequently is moved along the cutting direction. As a result, the jagged elevation is advantageously used for fixing the workpiece during the cutting up. Furthermore, the jagged elevation ensures that the cut workpieces have rounded edge profiles instead of cutting burrs.

In a further embodiment of the present disclosure it is provided that the jagged elevation is made to enter the workpiece up to one third of the extent (thickness) of the workpiece that runs along the cutting direction. The entering of the jagged elevation has the effect of localizing the crack formation for the subsequent shear cutting. Furthermore, the expenditure of force required for the shear cutting is advantageously reduced.

Further details, features and advantages of the present disclosure emerge from the drawings, and also from the following description of preferred embodiments on the basis of the drawings. The drawings thereby merely illustrate advantageous embodiments of the present disclosure that do not restrict the essential concepts disclosed herein.

In the various attached drawing figures discussed below, like parts are identified with like numerical reference designations, and are therefore in each case also generally only referred to or mentioned once.

Figure 1:
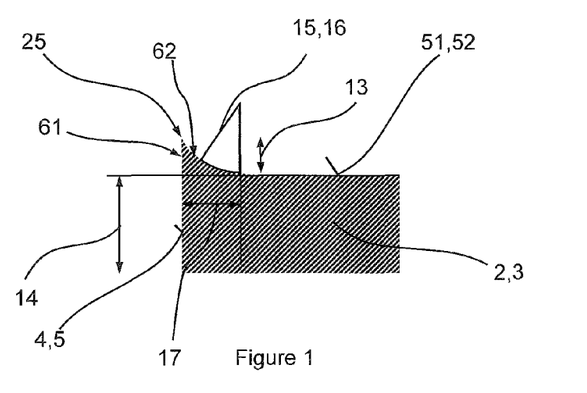
FIG. 1 is a schematic side profile view of an embodiment of an upper or lower blade of a tool of the present disclosure.

In FIG. 1, a lower blade 2 or an upper blade 3 for a tool 1 for shear cutting according to a first exemplary embodiment of the present disclosure is represented. It is provided in this case that the tool 1 comprises an upper blade 3, a lower blade 2 and a hold-down device 6, the upper blade 3 being movable in relation to the lower blade 2 along a cutting direction "A". In order to sever the workpiece 30, it is placed on the lower blade 2, preferably on a pressure-loaded surface 51 of the lower blade 2. In particular, the workpiece 30 is arranged at least partially between the lower blade 2 and the hold-down device 6, whereby the workpiece 30 is at least partially arranged in an interlocking manner in each case with respect to the lower blade 2 and with respect to the hold-down device 6 along a direction that runs parallel to the cutting direction A. The lower blade 2 also has a cutting surface 4, the general profile of which runs substantially parallel to the cutting direction "A" and substantially perpendicularly to the pressure-loaded surface 51. Furthermore, the upper blade 3 has a further cutting surface 5 and a further pressure-loaded surface 52. The cutting surface 4 is preferably comprised by a first plane and the further cutting surface 5 is preferably comprised by a second plane, the distance between the first plane and the second plane defining a cutting gap. In this case, the cutting gap is preferably smaller than an extent of the workpiece 30 that runs parallel to the cutting direction "A".

For cutting up the workpiece 30, the workpiece 30 is preferably arranged on the lower blade 2 in such a way that a location of the workpiece 30 at which the workpiece 30 is to be cut up is aligned with the cutting surface 4. It is also provided that the workpiece 30 protrudes beyond a cutting edge 25, the pressure-loaded surface 51, 52 and the cutting surface 4, 5 coming together or butting together at the cutting edge 25. When there is a relative movement of the upper blade 3 along the cutting direction "A", the workpiece 30 is then consequently partially entrained. The interlocking engagement of the workpiece 30 with the lower blade 2 has the effect that the workpiece 30 is on one side hindered from performing the relative movement, whereby the workpiece 30 is torn apart or broken through. At the end of the relative movement of the upper blade 3, the workpiece 30 has been cut up, the waste product of the cut workpiece 31 being located on the side of the upper blade 3 and the usable part of the cut workpiece 31 being arranged between the lower blade 2 and the hold-down device 6.

In particular, it is provided that the lower blade 2 has a jagged elevation 11 or else the upper blade 3 has a jagged elevation 12. The following embodiment concerning the jagged elevation 11 of the lower blade 2 also applies in an analogous way to the jagged elevation 12 of the upper blade 3, and is therefore only stated once by way of example for the jagged elevation 11. The jagged elevation 11 of the lower blade 2 has a first side surface 61 and a second side surface 62. The first side surface 61 preferably adjoins flush with the cutting surface 4 or is at least partially part of the cutting surface 4. The second side surface 62 preferably goes over continuously into the pressure-loaded surface 51 or is a component part of the pressure-loaded surface 51. It is provided in this respect that the cutting surface 4 goes over via the jagged elevation 11 into the pressure-loaded surface 51 along a contour profile. In particular, the jagged elevation 11 comprises a cutting edge 25. In the embodiment that is presented in FIG. 1, the jagged elevation 11 is curved on the pressure-loaded surface side. In particular, the profile of the curvature follows a circle with a radius 15. Furthermore, a height 13 and a width 17 of the jagged elevation 11 can be defined. In particular, the height 13 and the width 17 of the jagged elevation 11 are adapted to the material of the workpiece 1 to be severed.

Figure 2:
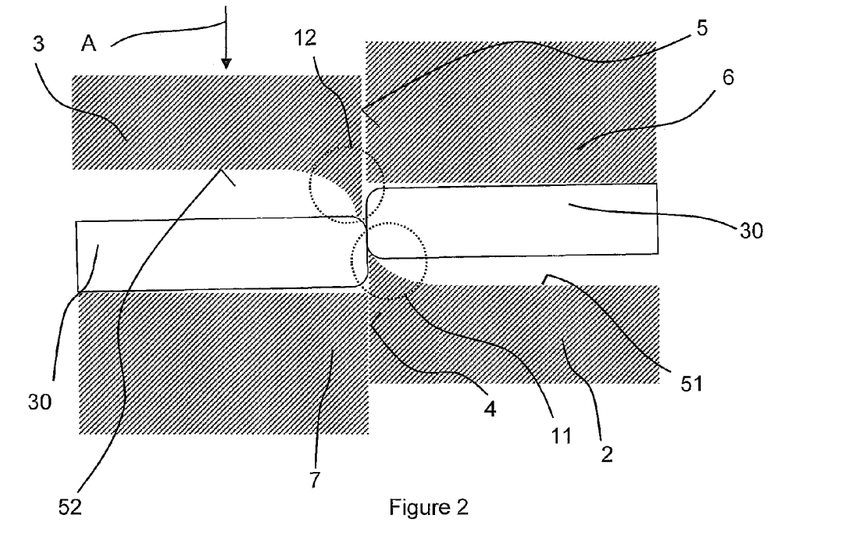
FIG. 2 is a schematic side profile view of an embodiment of a tool of the present disclosure having an upper and a lower blade as shown in FIG. 1.

In FIG. 2, a tool 1 according to a second exemplary embodiment of the present disclosure is schematically represented. Apart from the hold-down device 6, the upper blade 3 and the lower blade 2, the tool 1 represented in the second embodiment comprises a counterholder 7. It is also provided in the second embodiment that the lower blade 2 has a jagged elevation 11 and the upper blade 3 has a jagged elevation 12. In particular, the jagged elevation 11 and the jagged elevation 12 are aligned in opposing directions, in particular along two directions predetermined by the cutting direction "A". The jagged elevation 11 thereby performs a dual function in a positive way. First of all, the jagged elevation 11 assists the fixing of the workpiece 30, in that it prevents the workpiece 30 from slipping along a direction perpendicularly to the cutting direction "A" as soon as the jagged elevation 11 has at least partially penetrated or entered into the workpiece 30. In addition, the jagged elevation 11 prevents the formation of burrs during the cutting up of the workpiece 30 and forms a rounding on the workpiece 30. In this case, the jagged elevation 11 is formed in such a way that the jagged elevation 11 holds the part that would otherwise be carried along by the part of the workpiece 30 that is entrained. In other words, the jagged elevation 11 is designed in such a way that, when there is a relative movement of the upper blade 3, the jagged elevation 11 interacts in an interlocking manner with the part of the workpiece 30 that is not entrained along a direction along which the part of the workpiece 30 that is entrained pulls on the part of the workpiece 30 that is not entrained. Without the jagged elevation 11, a part could otherwise be torn out of the part of the workpiece 30 that is not entrained. Such tearing out typically leads to cutting burrs. When a tool 1 that has a jagged elevation 11 arranged on its lower blade 2 is used, the cut workpiece 30 has in a positive way a rounded edge instead of a cutting burr. In particular, one of the factors determining the degree of rounding is the radius 15 of the curvature of the second side surface 62. Furthermore, the jagged elevation 12 on the upper blade 3 also plays a part in controlling the cutting up of the workpiece 30. It is provided in this respect that the jagged elevation 12 ensures that the cut-off part of the workpiece 30 also has round edges.

Figure 3:
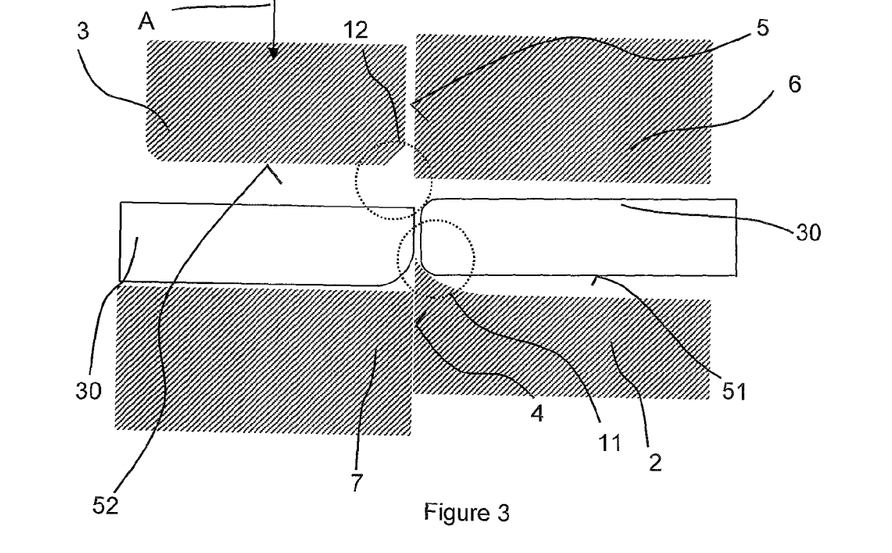
FIG. 3 is a schematic side profile view of an alternate embodiment of a tool of the present disclosure having a lower blade as shown in FIG. 1.

In FIG. 3, a tool 1 according to a fourth exemplary embodiment of the present disclosure is represented. In comparison with the embodiment shown in FIG. 2, the jagged elevation 12 of the upper blade 3 is replaced by a chamfered contour profile between the cutting surface 5 and the pressure-loaded surface 52. In particular, the cutting surface 5 goes over into the pressure-loaded surface 52 through two inflections along the contour profile of the upper blade 3. Furthermore, a composite material is represented as the workpiece 30.

Figure 4:
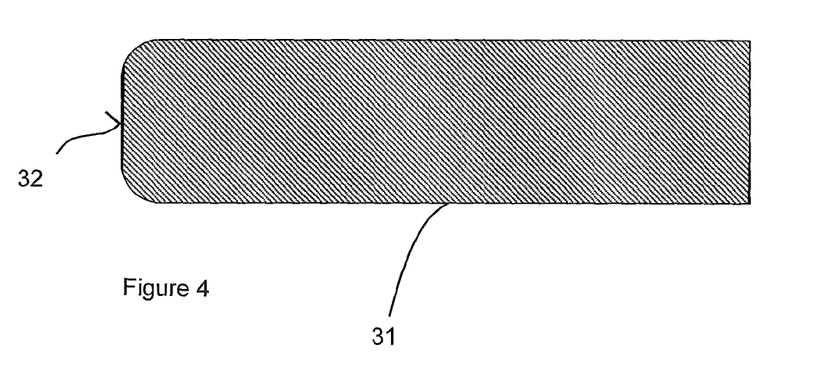
FIG. 4 is a side profile view of a cut metal sheet that has been cut by an embodiment of a tool of the present disclosure.

In FIG. 4, a cut metal sheet 31 that has been cut with a tool 1 according to the present disclosure is represented. The cut surface 32, along which the workpiece 30 has been cut up, has in a positive way no cutting burrs but rather rounded cutting edges.

Figure 5A:
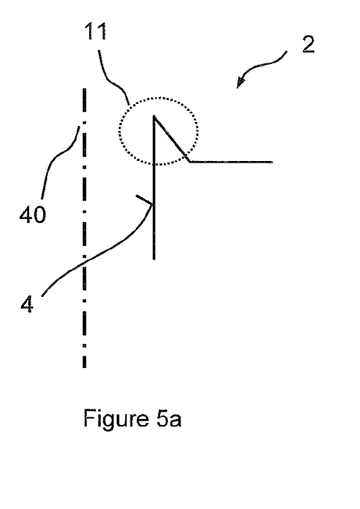
FIGS. 5a and 5b are side detail views of alternate embodiments of a lower blade of a tool for shear cutting sheet metal, as disclosed herein.
Figure 5B:
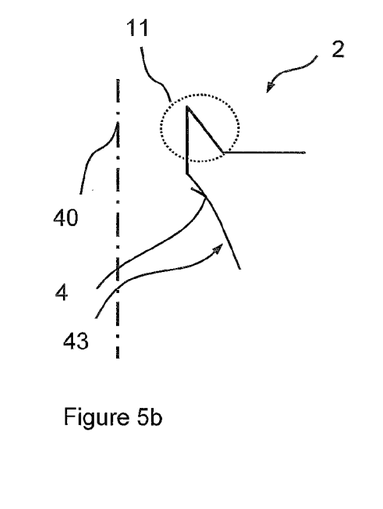

In FIGS. 5*a* and 5*b*, different designs of the lower blade 2 for a tool 1 according to a fifth and sixth exemplary embodiment of the present disclosure are represented. In particular, the contour profile of the lower blade 2 is illustrated with respect to an imaginary reference line. The reference line 40 runs substantially parallel to the cutting direction "A". The contour profile represented here traces at least partially the cross section of the lower blade 2 in a plane which comprises the reference line and runs perpendicularly to the cutting surface 4. In FIG. 5*a*, the contour reveals a cutting surface 4, which runs parallel to the reference line 40. The cutting surface 4 and the pressure-loaded surface 51 are connected to one another by way of the jagged elevation 11. In FIG. 5*b*, the cutting surface 4 has a recess 43. Such a set-back profile of the cutting surface 4 may be used for pushing out a chad, i.e. the cut-off part of the workpiece 30.

Figures 6A, 6B:
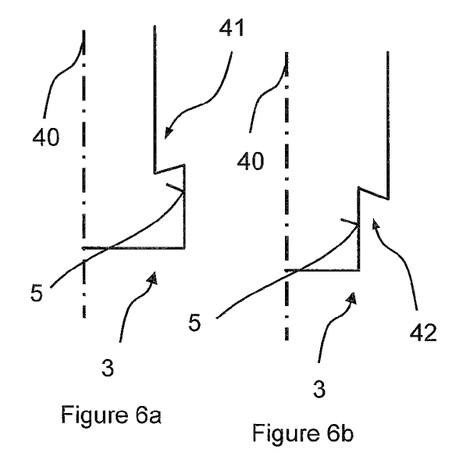
FIGS. 6a-6d are side detail views of alternate embodiments of an upper blade of a tool for shear cutting sheet metal, as disclosed herein.
Figures 6C, 6D:
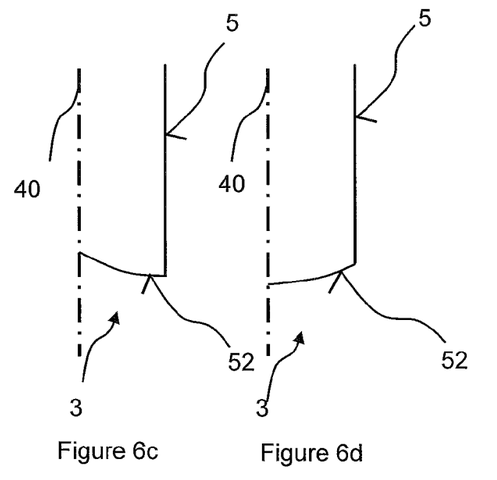

In FIGS. 6*a* to 6*d*, different designs of the upper blade 3 for a tool 1 according to a seventh, eighth, ninth and tenth exemplary embodiment of the present disclosure are represented. In particular, the contour profile of the upper blade 3 is illustrated with respect to the imaginary reference line 40. The contour profile represented here traces at least partially the cross section of the upper blade 3 in a plane which comprises the reference line 40 and runs perpendicularly in relation to the cutting surface 5. In the seventh embodiment in FIG. 6*a*, the cutting surface 5 has an indentation 41. In particular, it is provided here that the cutting surface 5 has an offset, which is preferably oriented at an acute angle. It is meant by this that a contour profile of the cutting surface 5 is formed in a z-shaped manner in the region of the offset. As a result, a cutting surface 5 that ideally allows an after-cut of the cut workpiece 30 with the upper blade 3 can be realized. By means of the after-cut, the cutting result can be improved further. A further design of the upper blade 3 that allows the after-cut is illustrated in FIG. 6*b*. Here, the cutting surface 5 comprises a recess 42, the cutting surface 5 in turn having an offset that runs in a pointed form. In FIGS. 6*c* and 6*d*, the pressure-loaded surfaces 52 are distinguished by a curved profile. It is provided in this respect that the pressure-loaded surface 52 is slightly angled in relation to the cutting surface 5 in the region of the cutting edge 25. In FIG. 6*c*, the contact surface is of a concave design and in FIG. 6*d* it is of a convex design.

Figure 7:
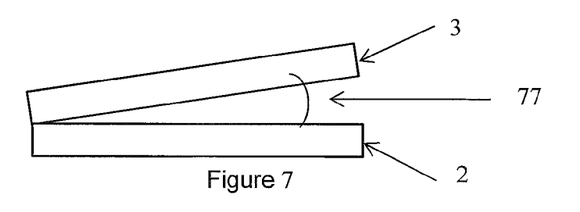
FIG. 7 shows an embodiment of an arrangement of an upper blade in relation to a lower blade of a tool as disclosed herein.

In FIG. 7, the pressure-loaded surface 52 of the upper blade 3 and the pressure-loaded surface 51 of the lower blade 2 are schematically represented in an angled arrangement in relation to one another. The angle provided, also referred to as the shearing angle (77), is preferably 1° to 5°, whereby the shearing force can be reduced further.

What is claimed is:

1. A tool for shear cutting a workpiece, comprising:
   a lower blade having a first pressure-loaded surface, a first cutting surface, and a first contour profile with a first jagged elevation defined at a transition between said first cutting surface and said first pressure loaded surface;
   a first hold-down device disposed above and opposing said lower blade and configured to permit the workpiece to be disposed between said hold-down device and said first pressure-loaded surface of said lower blade; and
   an upper blade moveable in relation to said lower blade along a cutting direction,
   wherein said upper blade includes a second cutting surface, a second pressure-loaded surface, and a second contour profile having a second jagged elevation disposed at a transition between said second cutting surface and said second pressure-loaded surface, wherein said second pressure-loaded surface is at least one of curved or disposed at an angle of between about 60° and about 90° degrees relative to said second cutting surface.

2. The tool of claim 1, wherein the first jagged elevation is pointed towards the first hold-down device.

3. The tool of claim 1, wherein said second jagged elevation of said upper blade is directed in a substantially opposing direction to said first jagged elevation of said lower blade.

4. The tool of claim 1, wherein a cutting gap that runs parallel to the cutting direction is defined between said first and second cutting surfaces, and has a cutting gap width between about 5% and about 20% of a thickness of the workpiece to be cut.

5. The tool of claim 1, wherein at least one of said first and second jagged elevations has a first side surface and a second side surface, wherein said first side surface extends along said respective cutting surface, and wherein said second side surface is at least one of curved or continuously transitions into said respective pressure-loaded surface that is perpendicular to said respective cutting surface.

6. The tool of claim 5, wherein said second side surface is at least a partial cylindrical surface having a first radius.

7. The tool of claim 4, wherein a surface of said first hold-down device is either coplanar with a plane of said first cutting surface or protrudes into said cutting gap.

8. The tool of claim 1, wherein said lower blade has an undercut defined in at least a portion of said first cutting surface.

9. The tool of claim 1, wherein said upper blade has at least one of an undercut or a recess defined in said second cutting surface, said undercut or recess at least partially including an acute angle between said cutting surface and said undercut or recess.

10. The tool of claim 1, further comprising a counter-holder disposed opposite said upper blade, and configured to permit the workpiece to be disposed between said counter-holder and said upper blade.

11. The tool of claim 1, wherein, for an open cut, said first cutting surface of said lower blade is disposed at an angle of between about 1° and about 5° with respect to said second cutting surface of said upper blade, and wherein for a closed cut said first cutting surface of said lower blade is disposed at an angle of between about 10° and about 20° with respect to said second cutting surface of said upper blade.

12. The tool of claim 1, wherein said upper blade is part of a punch and said lower blade is part of a cutting die.

13. The tool of claim 1, wherein a second pressure-loaded surface of said upper blade is inclined with respect to said first pressure-loaded surface of said lower blade so as to form a shearing angle there between.

14. A method for shear cutting a workpiece, comprising:
providing a tool according to claim 1;
arranging a work piece between the first hold-down device and the lower blade;
forcing the first jagged elevation of the lower blade at least partially into the workpiece in the cutting; and
moving the upper blade in the cutting direction through a width of the work piece,
wherein said forcing step includes forcing the first jagged elevation of the lower blade up to one-third of the way into the thickness of the workpiece in the cutting direction.

* * * * *